(12) United States Patent  (10) Patent No.: US 7,454,867 B2
Nicoletti (45) Date of Patent: Nov. 25, 2008

(54) STRUCTURE FOR SUPPORTING ELEMENTS TO FORM A WALL

(75) Inventor: Bruno Nicoletti, Calderino di Monte S. Pietro (IT)

(73) Assignee: Metal Work S.r.l., Calderino di Monte S. Pietro (Bologna) (IT)

( * ) Notice: Subject to any disclaimer, the term of this patent is extended or adjusted under 35 U.S.C. 154(b) by 322 days.

(21) Appl. No.: 11/356,508

(22) Filed: Feb. 17, 2006

(65) Prior Publication Data

US 2006/0179788 A1 Aug. 17, 2006

(30) Foreign Application Priority Data

Feb. 17, 2005 (IT) .......................... BO2005A0076

(51) Int. Cl.
*E04H 1/00* (2006.01)
*E04H 3/00* (2006.01)
*E04H 5/00* (2006.01)
*E04H 6/00* (2006.01)
*E04H 14/00* (2006.01)
*E04B 7/00* (2006.01)
*A47F 10/00* (2006.01)

(52) U.S. Cl. .................. 52/238.1; 52/23.1; 52/36.1; 52/239; 52/243.1

(58) Field of Classification Search .................. 52/23.1, 52/36.1, 238.1, 239, 243.1
See application file for complete search history.

(56) References Cited

U.S. PATENT DOCUMENTS

| 3,619,960 | A | * | 11/1971 | Thompson | .................... 52/241 |
| 4,709,517 | A | * | 12/1987 | Mitchell et al. | .............. 52/36.6 |
| 4,778,487 | A | * | 10/1988 | Chenel | ........................ 52/239 |
| 4,883,848 | A | * | 11/1989 | Suga et al. | ................ 526/125.3 |
| 5,634,300 | A | * | 6/1997 | Huebner et al. | .............. 52/36.1 |
| 6,094,872 | A | * | 8/2000 | Ward et al. | .................. 52/126.4 |
| 6,179,511 | B1 | * | 1/2001 | Gassler | .................... 403/322.1 |
| 6,341,457 | B1 | * | 1/2002 | Aerts et al. | ................... 52/239 |
| 6,446,396 | B1 | * | 9/2002 | Marangoni et al. | ........... 52/36.1 |
| 6,786,017 | B2 | * | 9/2004 | Thompson | .................... 52/298 |
| 6,820,388 | B2 | * | 11/2004 | Newhouse et al. | ......... 52/726.1 |
| 2002/0100236 | A1 | * | 8/2002 | Kuipers et al. | ................. 52/239 |
| 2003/0213193 | A1 | * | 11/2003 | Carroll et al. | .............. 52/238.1 |

* cited by examiner

*Primary Examiner*—Brian Glessner
*Assistant Examiner*—Branon C Painter
(74) *Attorney, Agent, or Firm*—William J. Sapone; Coleman Sudol Sapone P.C.

(57) ABSTRACT

In a structure for supporting components of a wall, one lower profile section is shaped to form longitudinal recesses and an operating unit is associated with the lower profile section base, and removably coupled at top to at least one structural element. The operating unit has one foot, shaped to form at least one protrusion for coupling, when the operating unit is rotated about a vertical axis, with the longitudinal recesses by engagement at least of the protrusion with a matching portion of the recesses, thus forming a bayonet joint between the operating unit and the lower profile section.

44 Claims, 11 Drawing Sheets

STRUCTURE FOR SUPPORTING ELEMENTS TO FORM A WALL

FIELD OF THE INVENTION

This invention relates to structures for supporting partition walls.

BACKGROUND OF THE INVENTION

Partition walls are commonly used in houses and other buildings, especially offices, to optimise available space and to divide a large open space into two or more separate rooms used for different purposes such as, for example, separate offices or booths.

The partitioning may be partial or total, depending on whether the partition walls used are, respectively, lower or equal in height to the room concerned, and may consist of modular components, each formed by a pair of uprights with, extending between them, a panel held in the vertical position by a bases or suitable supports.

SUMMARY OF THE INVENTION

The object of this invention is to propose a new concept structure for supporting the components of a partition wall, whether straight or segmented and equal in height to or lower than the room in which it is installed and that is easy and inexpensive to install in a relatively short time.

Another object of the invention is to propose a structure made in such a way that it can be fastened to the ceiling or to vertical walls.

A further object of the invention is to provide a structure that requires a minimum use of traditional fastening elements, such as screws, bolts and the like, to join its components together.

Yet another object of the invention is to propose an especially strong structure that will support glass panes, double glazing, and single or double panelling, even of considerable size.

The foregoing objects are achieved by the invention, as described in the claims, by a structure for supporting components to form a wall, including:

at least one lower profile section, fastened to a fixed support and shaped to form longitudinal recesses on each side of it;

a first operating unit associated with the lower profile section base, the latter being removably coupled at top to at least one structural element and being equipped, at an end facing the lower profile section, with at least one foot, shaped to form at least one protrusion which, when the first operating unit is rotated about a vertical axis, enables the foot to be coupled with the longitudinal recesses by engagement at least of the protrusion with a matching portion of the recesses to form a bayonet joint between the first operating unit and the lower profile section

BRIEF DESCRIPTION OF THE DRAWINGS

Further characteristics of the invention, not evident from the above, will be described in more detail below in accordance with the claims and with reference to the accompanying drawings, in which:

DISCLOSURE OF THE PREFERRED EMBODIMENTS

Figure 1:
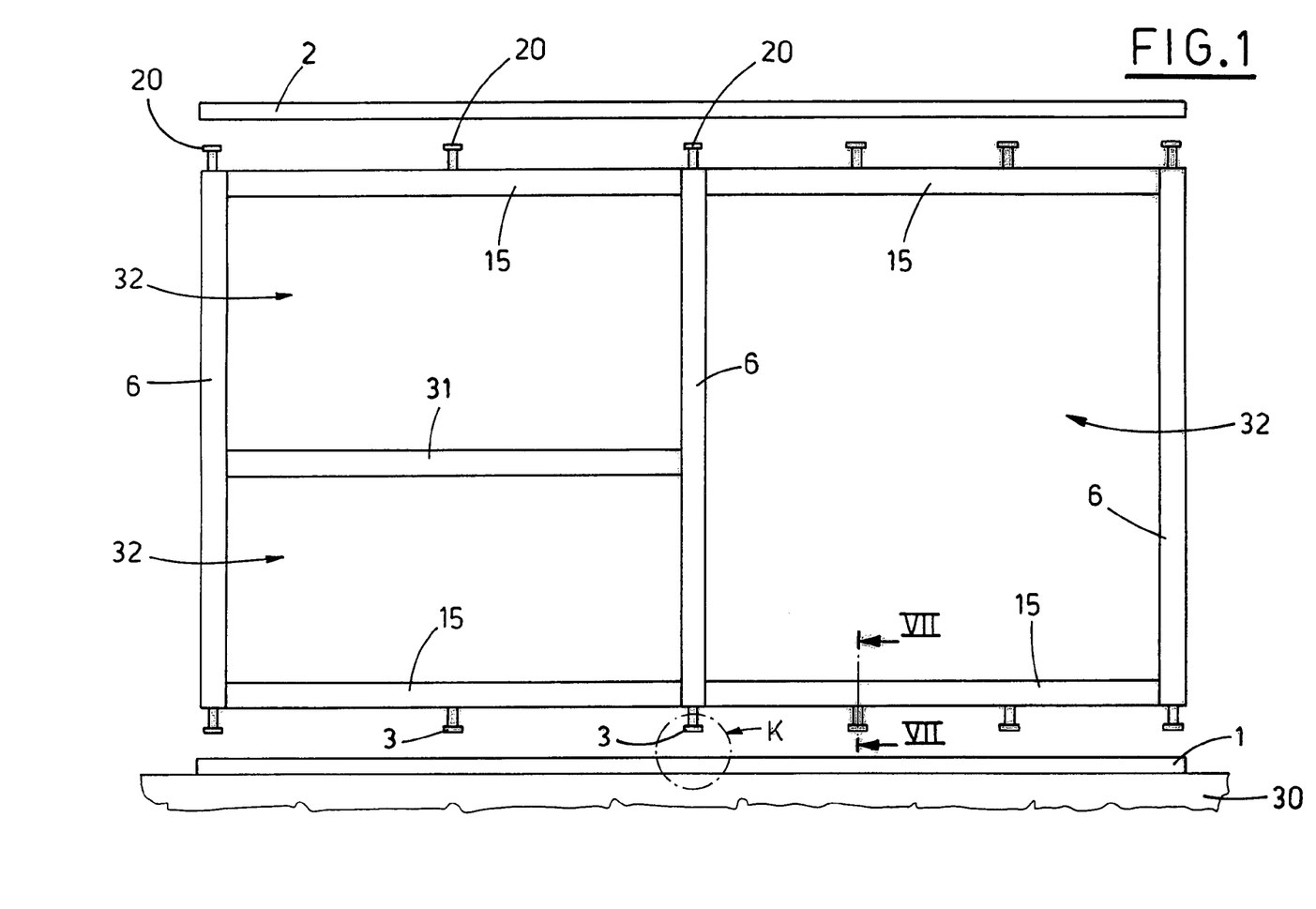
FIG. 1 is a schematic front view of a possible embodiment of the structure according to the invention.

With reference to the accompanying drawings, in particular FIG. 1, the numeral 1 indicates a lower profile section, for example attached to a fixed support 30 (for example, the floor) and the numeral 2 an upper profile section which may, if necessary, be attached to a fixed frame, not illustrated (for example, the ceiling). The lower and upper profile sections 1 and 2, which may, for example, be identical, are shaped to form longitudinal recesses 1*j*, 1*k* on each side of them (FIGS. 4 and 5) and are associated, after interposition of a first and a second operating unit 3 and 20, respectively, to structural components consisting of uprights 6 and crosspieces 15; in the drawing, the crosspieces, together with intermediate crosspieces 31, define the perimeter of respective panels 32 attached to them.

In the specification that follows, express reference will be made to the couplings between the first operating unit 3 and the lower profile section 1 and the upright 6 or the crosspiece 15; the same remarks and observations made below in connection with these couplings and embodiments thereof may be extended to the couplings between the second operating unit 20 and the upper profile section 2 and the upright 6 or the crosspiece 15, without thereby excluding the fact that the first and second operating units 3 and 20 may be identical to each other. In the description, different embodiments or variants of the uprights 6, crosspieces 15, operating units 3 and components thereof may be denoted by the same reference numbers with different indices.

Figure 2:
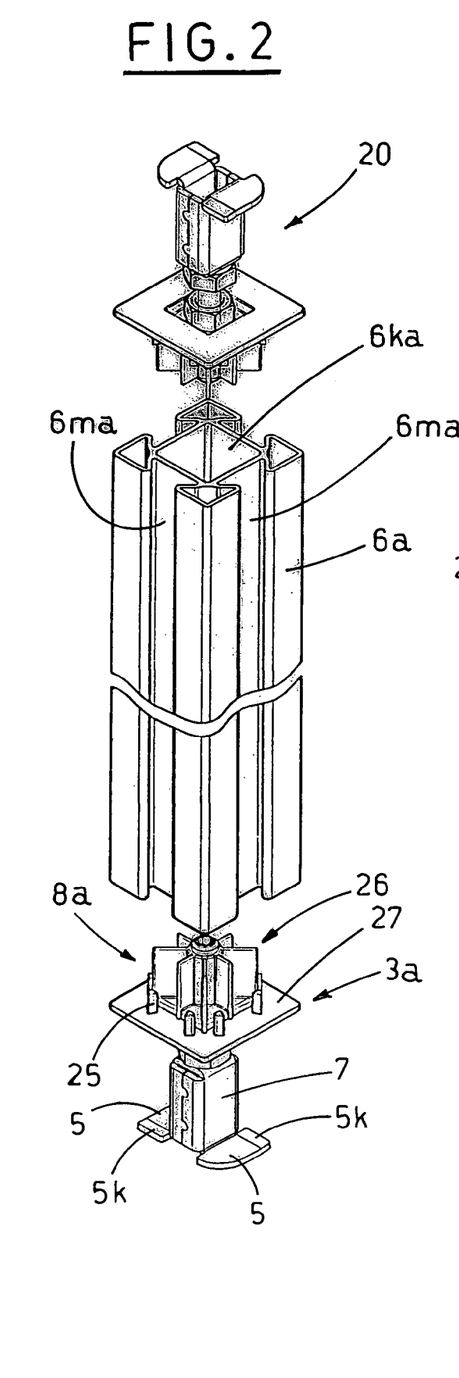
FIG. 2 is a perspective, exploded view of an upright and two operating units of the structure according to the invention.
Figure 3:
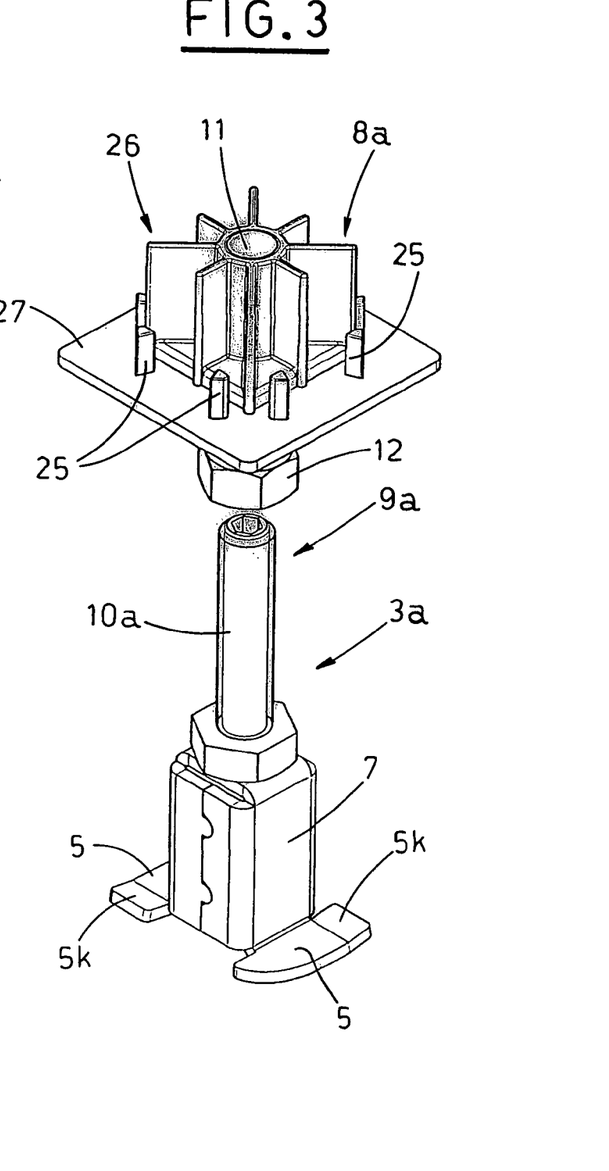
FIG. 3 is an enlarged perspective view of one of the operating units of FIG. 2.

FIGS. 2 and 3 show a first operating unit 3a, designed to be coupled with an upright 6a consisting of a profile section having made in it a longitudinal through hole 6ka and longitudinal grooves 6ma that form the shape of its four sides and are accessible from the outside. The first operating unit 3a comprises a base member 7, having at the bottom of it a pair of feet 5, a connector 8a and means 9a for joining the base member 7 and the connector 8a to each other. The two feet 5 are located at opposite ends of the base member 7, one being attached to the latter in one direction and the other in the opposite direction, as shown in FIG. 3; each foot 5 extending in a substantially laminar fashion except for a protrusion 5k made at one end of it for example by upwardly bending an end portion of it through a certain angle.

The connector 8a consists of a rectangular plate 27 that mounts a plurality of pins 25 and shaped to form at the top of it an element 26 with a radial structure; it also has a threaded through hole 11 extending axially for the full length of the element 26. The joining means 9a consist of a threaded shank 10a fastened in known manner to the base member 7, on one side, and designed to be coupled with the threaded hole 11, on the other side; means 12, consisting for example of a locknut, are provided to keep the coupling tight.

Figure 7:
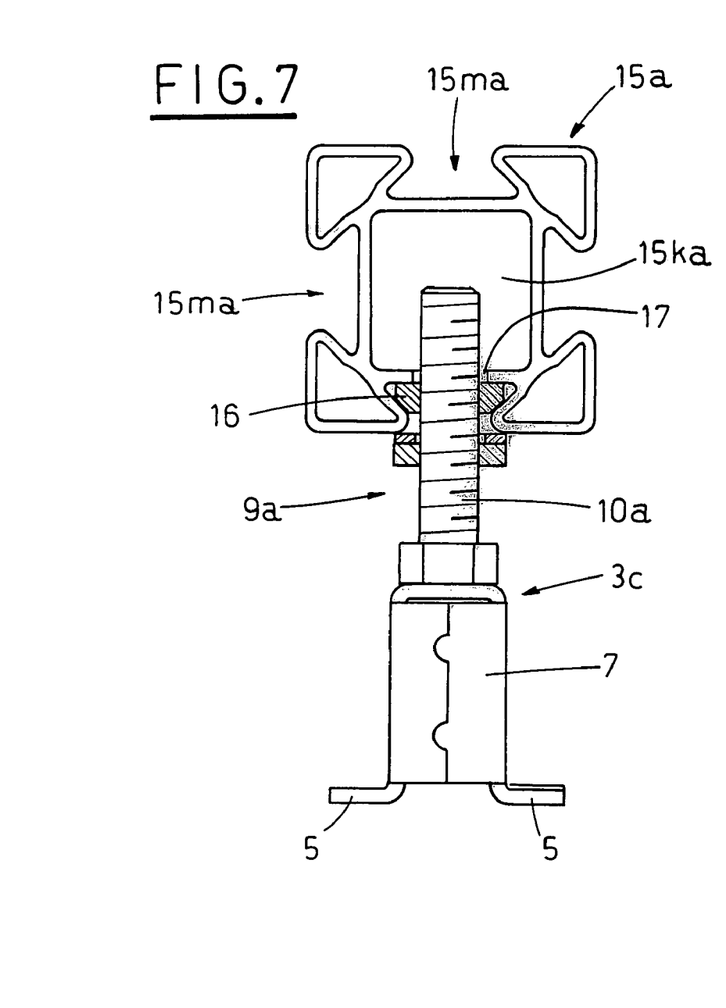
FIG. 7 is a partial view of the cross section VII-VII of FIG. 1 through a crosspiece and an operating unit.
Figure 8:
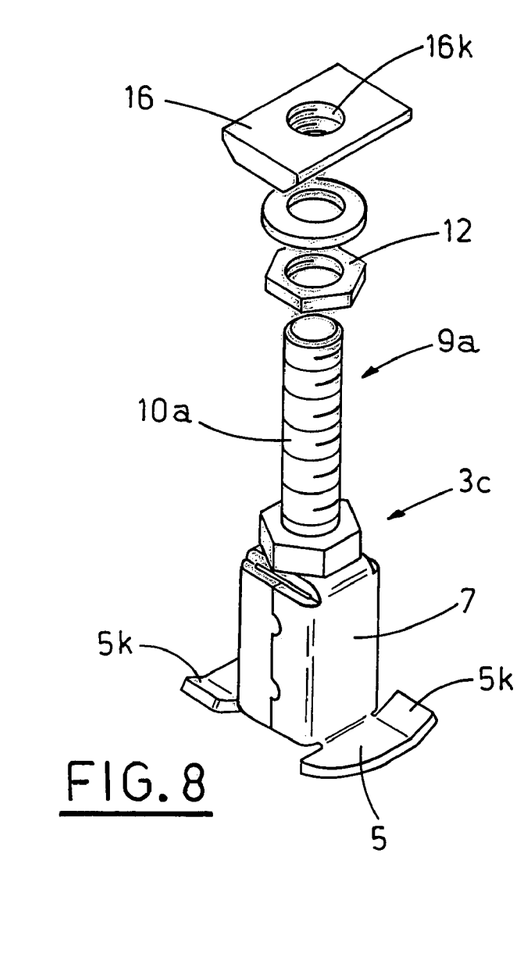
FIG. 8 is a perspective view of the operating unit of FIG. 7.

FIG. 7 shows the coupling between a first operating unit 3c and a crosspiece 15a. The latter may, for example, be the same type of profile section as the upright 6a, and thus has a longitudinal through hole 15ka and longitudinal grooves 15ma that form the shape of its four sides and are accessible from the outside. The first operating unit 3c differs from the operating unit 3a in that it does not have the connector 8a and instead has a plate 16, whose cross section has the shape of a dovetail and which has a threaded through hole 16k made in it. In the operating configurations, the plate 16 is coupled with the longitudinal groove 15ma that faces the lower profile section 1 (in the manner described below), and the respective through hole 16k is coaxial with a matching through hole 17 made in the wall delimiting the groove 15ma.

Figure 17:
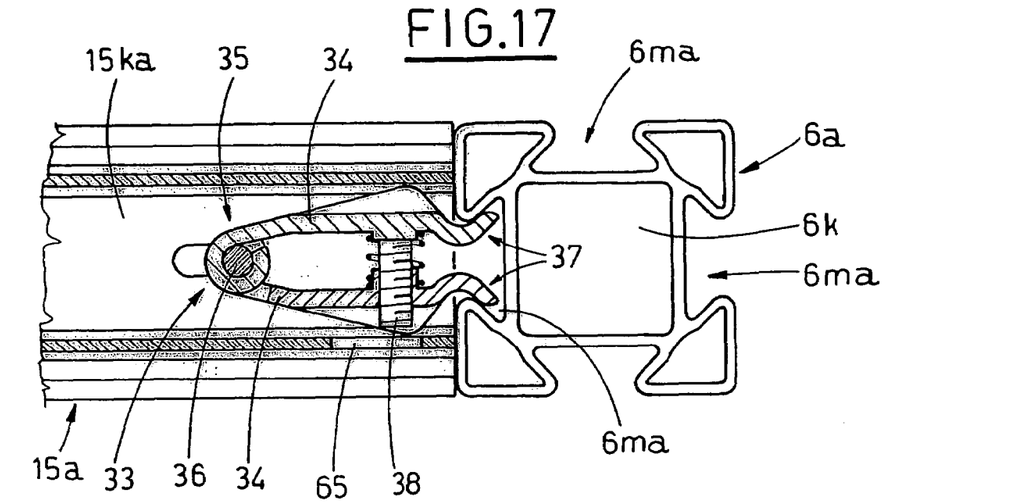
FIG. 17 schematically illustrates the coupling between a crosspiece and an upright of the structure according to the invention.

The uprights 6 are locked to the crosspieces 15 by respective clamps 33 located at the ends of them. FIG. 17, for example, shows the connection between an upright 6a and a crosspiece 15a, accomplished using a clamp 33: the latter consists of two jaws 34 hinged to each other at first ends 35 by a hinge pin 36 designed to attach the jaws 34 themselves to the wall of the through hole 15ka. In the vicinity of the opposite ends protruding from the end of the crosspiece 15a, the jaws 34 form locking means 37 which are coupled with the opposite walls of a matching longitudinal groove 6ma of the upright 6a. Spreading means 38, interacting with the jaws 34, cause the locking means 37 to move apart in such a way as to press the latter against the opposite walls of the longitudinal groove 6ma, thereby locking the crosspiece 15a to the upright 6a. The same applies to the coupling between uprights 6a and crosspieces 31, for example of the same type of profile section as the upright 6a.

Figures 4, 5, 6:
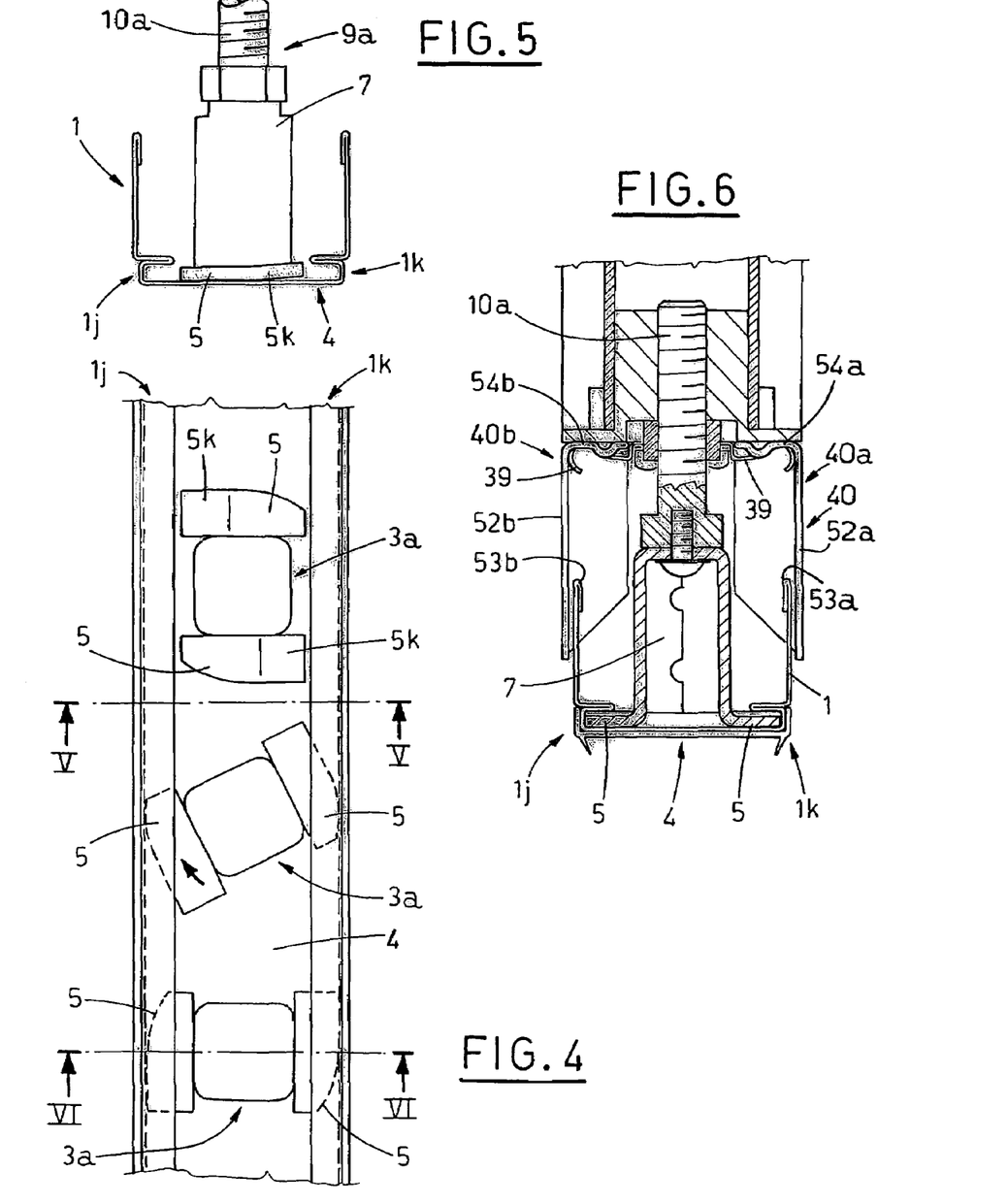
FIG. 4 shows the detail K from FIG. 1, in a plan view, illustrating the steps of coupling an operating unit of the structure with a support forming part of the structure itself.
FIG. 5 is a view of the cross section V-V of FIG. 4 with some parts cut away in order to better illustrate others.
FIG. 6 is a partial view of the cross section VI-VI of FIG. 4, through an upright of the structure.
Figure 20:
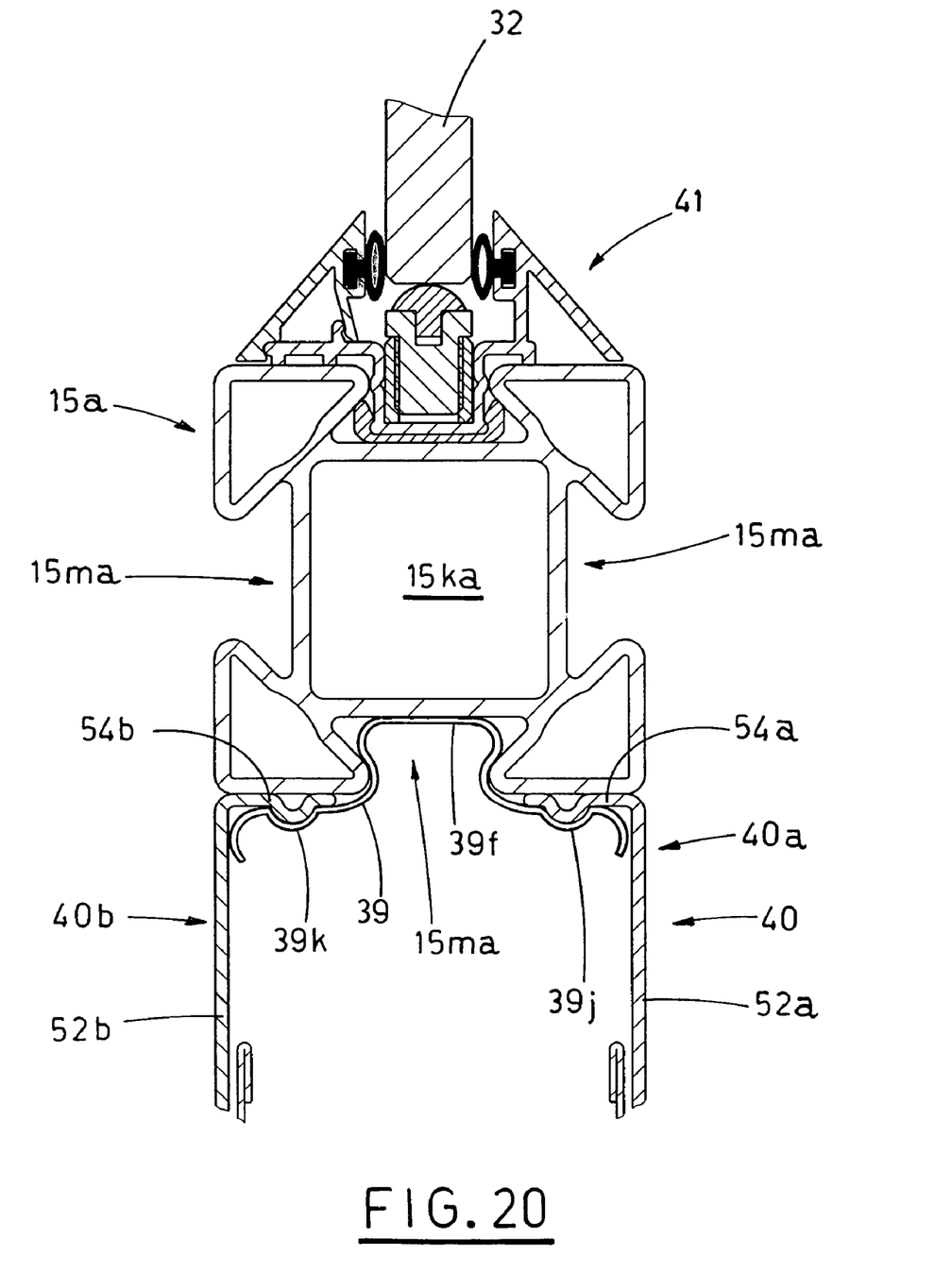
FIG. 20 is schematic cross section of the coupling between a crosspiece and a component for supporting a panel.

An apron 40 extends in a direction parallel to the lower profile section 1 and is interposed between the latter and the bottom of the crosspiece 15a (see FIG. 20, 6). It consists of two separate right-angled elements 40a, 40b, extending lengthways and each forming a vertical wall 52a, 52b whose lower end adheres to a matching top portion 53a, 53b of the lower profile section 1, and a horizontal portion 54a, 54b, with a given profile, associated with a plurality of spring clips 39 distributed along the crosspiece 15a. The latter have a central portion 39f that slots into the groove 15ma facing the lower profile section 1 and side wings 39j, 39k that are press coupled with corresponding horizontal portions 54a, 54b of the right-angled elements 40a, 40b in such a way as to support the latter. The apron 40 fulfils the twofold function of improving the appearance of and protecting the lower part of the structure according to the invention.

Still with reference to FIG. 20, there are means 41 coupled in known manner with a matching longitudinal groove 15ma in the crosspiece 15a and designed to support panels 32, consisting, for example, of glass panes, double glazing or single or double panelling.

The configuration of the structure according to the invention for supporting components of a wall will now be described in further detail. The couplings between the upright 6a and the lower profile section 1, between the crosspiece 15a and the lower profile section 1, between the upright 6a and the crosspieces (crosspiece 15a and intermediate crosspiece 31) and lastly, the connection between the panels 32 and all these structural elements will be described.

The first operating unit 3a is designed to engage with the lower profile section 1 to form a bayonet joint: with reference to FIG. 4, the first operating unit 3a is placed freely on the base 4 of the lower profile section 1 and then turned through a certain angle about its vertical axis in such a way as to slot the protrusions 5k of the feet 5 into the longitudinal recesses 1j, 1k of the lower profile section 1; this causes elastic deformation of the respective parts of the recesses in contact with the protrusions 5k, thus creating a secure coupling between the first operating unit 3a and the profile section 1.

The connector 8a is inserted into the hole 6ka of the upright 6a by press fitting the radial structure element 26 into the hole 6ka until the plate 27 abuts against the matching end of the upright 6a.

The means 9a, consisting of the threaded shank 10a, enable the connector 8a to be connected to the rest of the first operating unit 3a, so as to be able to adjust the distance between the two parts: as a result, a rigid assembly consisting of the lower profile section 1, the first operating unit 3a and the upright 6a is created.

As to the coupling between the crosspiece 15a and the first operating unit 3c, it may be noticed that the plate 16 slots into a matching portion of the longitudinal groove 15ma facing the lower profile section 1, in such a way that the threaded hole 16k is coaxial with the through hole 17 made in the crosspiece 15a; the threaded shank 10a constituting the aforementioned joining means 9a is designed to be screwed into the threaded hole 16k and to pass freely through the hole 17 and to extend past the end of it by a length that depends on the required distance between the base member 7 and the crosspiece 15a itself (see FIG. 7). The feet 5 slot into the matching recesses 1j, 1k in the same way as that described above.

As stated above, the connection of an upright 6a to a crosspiece 15a or to an intermediate crosspiece 31 is accomplished by means of an interposed clamp 33. The respective locking means 37 are first moved towards each other and between the opposite walls of the longitudinal groove 6ma of the upright 6a, and then moved apart in such a way as to press against the groove walls and lock the crosspiece 15a, or the intermediate crosspiece 31, to the upright 6a; the movement towards and away from each other is accomplished by adjusting the spreading means 38, which can be accessed through a suitable hole 65 made in the crosspiece 15a.

Figure 18:
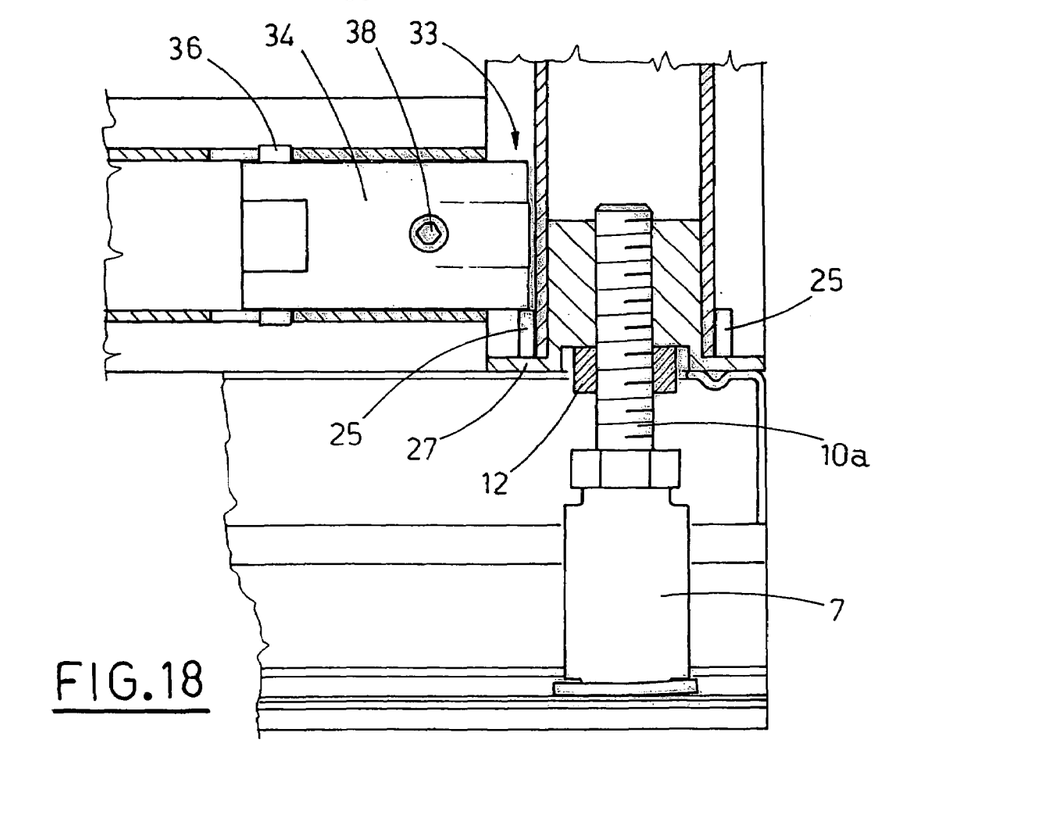
FIG. 18 schematically illustrates the coupling between an upright, a crosspiece and a support forming part of the structure according to the invention.

As may be inferred from FIGS. 17 and 18, which show the coupling between the upright 6a and the crosspiece 15a, the locking means 37 abut against respective pins 25 located on the rectangular plate 27, creating a predetermined reference of the lower part of the crosspiece 15a relative to the plate 27, so as simplify assembly operations.

The supporting structure according to the invention, illustrated by way of example in FIG. 1, is thus formed: the structure assembled in the manner described above may consist of a variable number of uprights 6, crosspieces 15, intermediate crosspieces 31, first and second operating units 3, 20, making it possible to create straight or segmented partition walls by attaching the lower and upper profile sections 1 and 2 to a support and fixed frame, respectively. The flexibility in assembling the structure constitutes an important advantage of the invention since it allows installation, according to personal taste and specific requirements, of partition walls of any kind, whether equal in height or lower than the room in which such partitions are installed.

Further, the structure according to the invention as described fully achieves the above mentioned aims since it is strong, despite having minimized the use of traditional fastening means, quick and easy to assemble, and relatively inexpensive compared to the results attained.

In a second embodiment of the invention, the uprights 6 and the crosspieces 15 have differently shaped cross sections and different operating units 3 from those described above.

Figures 9, 12:
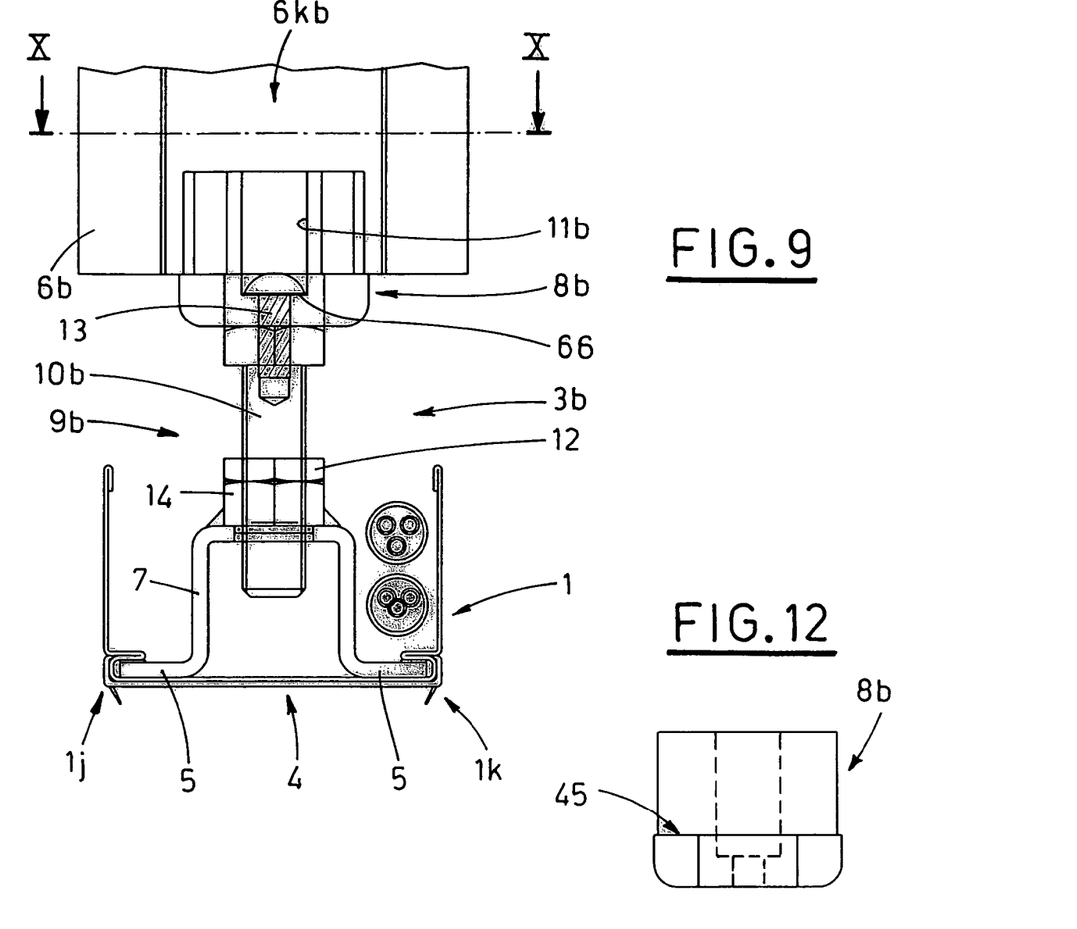
FIG. 9 illustrates another embodiment of an operating unit coupled with a support and an upright of the structure according to the invention.
FIGS. 11 and 12 are, respectively, a plan view and a side view of a component of the operating unit of FIG. 9.
Figure 10:
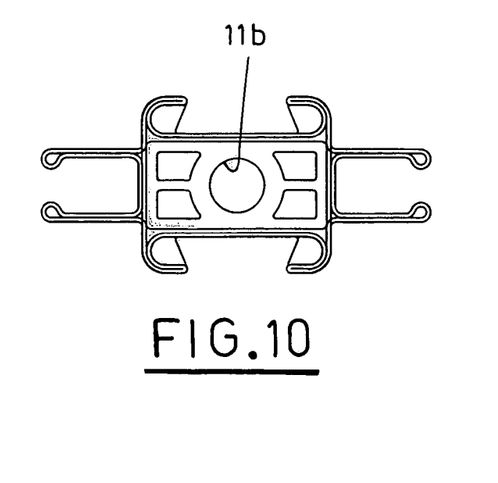
FIG. 10 is a schematic view of the cross section X-X of FIG. 9.
Figure 11:
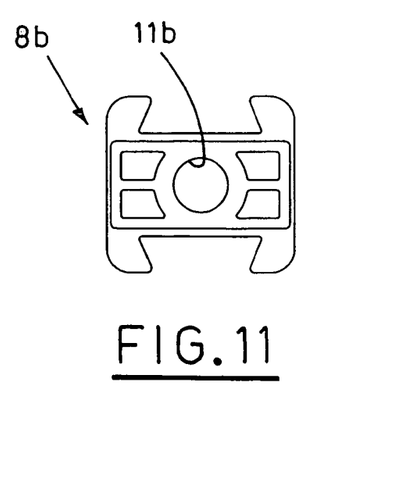
Figure 13:
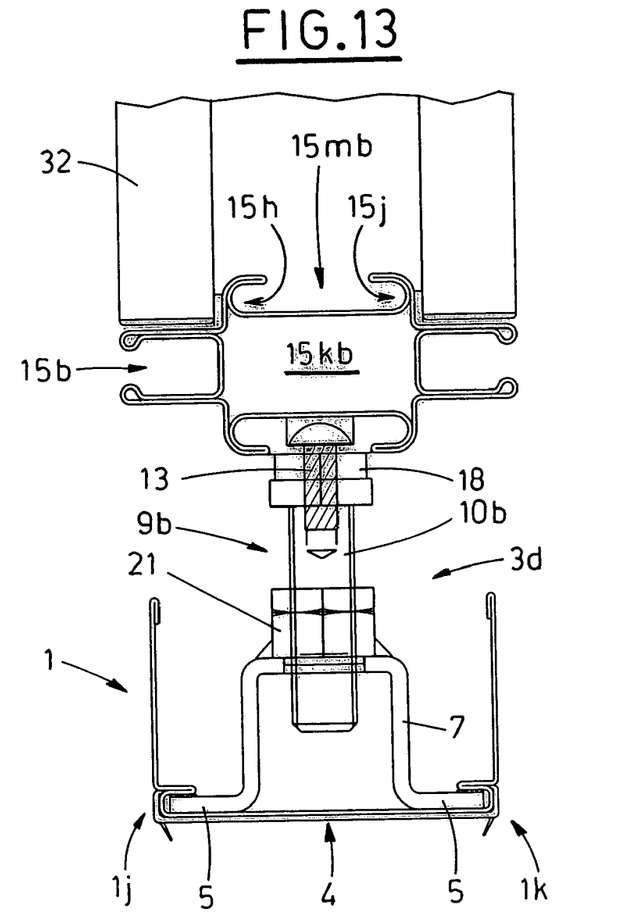
FIG. 13 illustrates a further embodiment of an operating unit coupled with a support and a crosspiece of the structure according to the invention.
Figure 14:
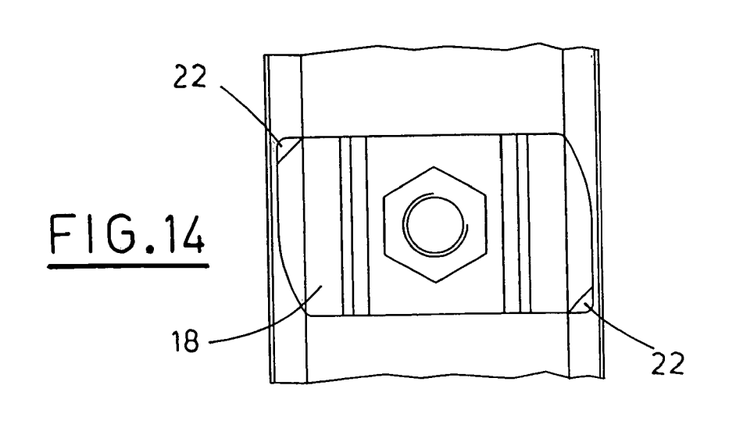
FIG. 14 is a schematic, scaled-up view of the coupling between the operating unit and the crosspiece shown in FIG. 13.

FIG. 9 schematically illustrates the coupling of a first operating unit 3b to a lower profile section 1 and an upright 6b, having a longitudinal hole 6kb, while FIG. 13 shows the coupling of a first operating unit 3d to a lower profile section 1 and a crosspiece 15b having the same type of profile section as the upright 6b, for example. As shown in FIG. 13, the crosspiece 15b is a profile section having made in it a longitudinal through hole 15kb and longitudinal grooves 15mb that form the shape of its sides and are accessible from the outside. In particular, the grooves comprise respective lateral recesses 15h, 15j.

With reference to FIG. 9, the first operating unit 3b comprises a base member 7, having at the bottom of it feet 5, a connector 8b and means 9b for connecting the base member 7 and the connector 8b to each other; the arrangement of the feet 5 is similar to that already described above in connection with the first operating unit 3a, 3c. The connector 8b is shaped to form a shoulder 45 and has a through hole 11b made in it having two different diameters, the diameter at its bottom end being smaller, in such a way as to form an annular crown 66, whilst the joining means 9b consist of a threaded shank 10b with a threaded axial hole at the top of it. At the top of it, the threaded shank 10b is fastened to the connector 8b by a screw 13 that engages both the through hole 11b and the threaded hole in the shank 10b itself until it abuts against the annular crown of the connector 8b itself, whilst the bottom of it is screwed into a matching threaded hole 14 made in the base member 7. In this case, too, there is a locknut 12 to keep the coupling between the shank 10b and the hole 14 tight.

Figure 15:
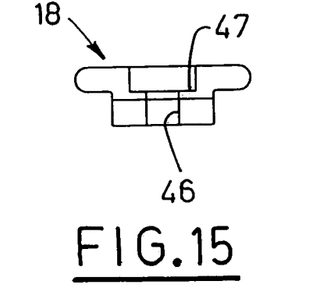
FIGS. 15 and 16 are, respectively, a side view and a plan view of a component of the operating unit of FIG. 13.
Figure 16:
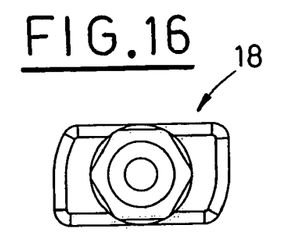

With reference to FIGS. 13-16, the first operating unit 3d differs from the operating unit 3b in that it does not have the connector 8b and, instead, has a plate 18, shown in FIGS. 15 and 16, with a through hole 46 made in it having two different diameters, the diameter at its bottom end being smaller, in such a way as to form an annular crown 47. The plate 18 also has lateral protrusions 22 made at the top of it. At the top of it, the threaded shank 10b is fastened to the plate 18 by a screw 13 that engages both the through hole 46 and the threaded hole in the shank 10b itself until it abuts against the annular crown 47.

Figure 19:
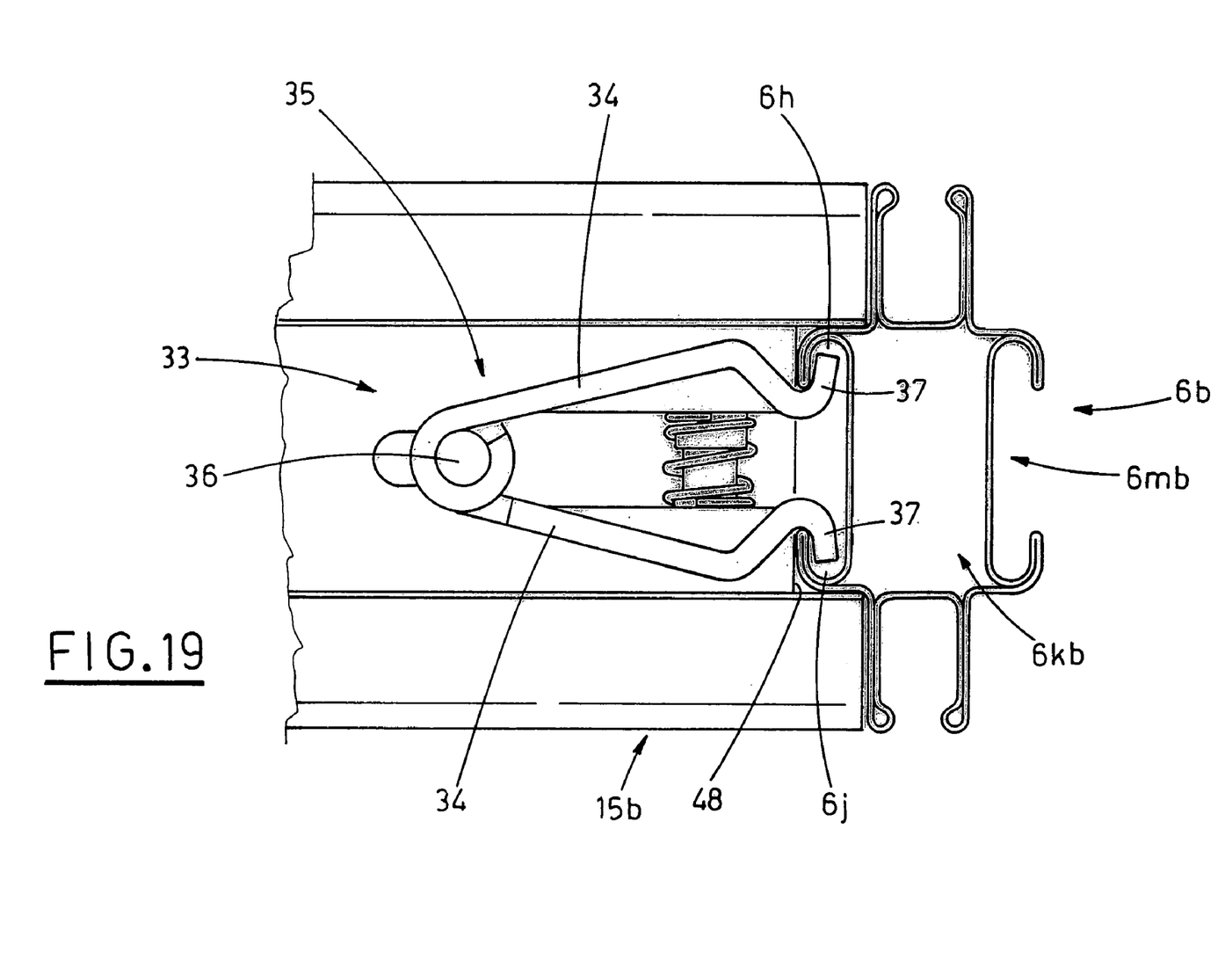
FIG. 19 schematically illustrates the coupling between a crosspiece and an upright of the structure similar to the one shown in a FIG. 17 but where the cross sections of the upright and crosspiece differ in shape from those illustrated in the preceding figures.

FIG. 19 shows the connection between an upright 6b and a crosspiece 15b, accomplished using the clamp 33 described above: in this case, owing to the cross sectional shape of the profile section, the coupling between the crosspiece 15b and the upright 6b is kept tight by means of a cavity 48 cut in the central portion of the crosspiece end. The constructional features of the clamp 33 in this second embodiment remain the same: in this case, the locking means 37 are slotted into the lateral recesses 6h, 6j formed in the longitudinal grooves 6ma in the upright 6b which form the shape of the latter's four sides and are accessible from the outside.

Figure 21:
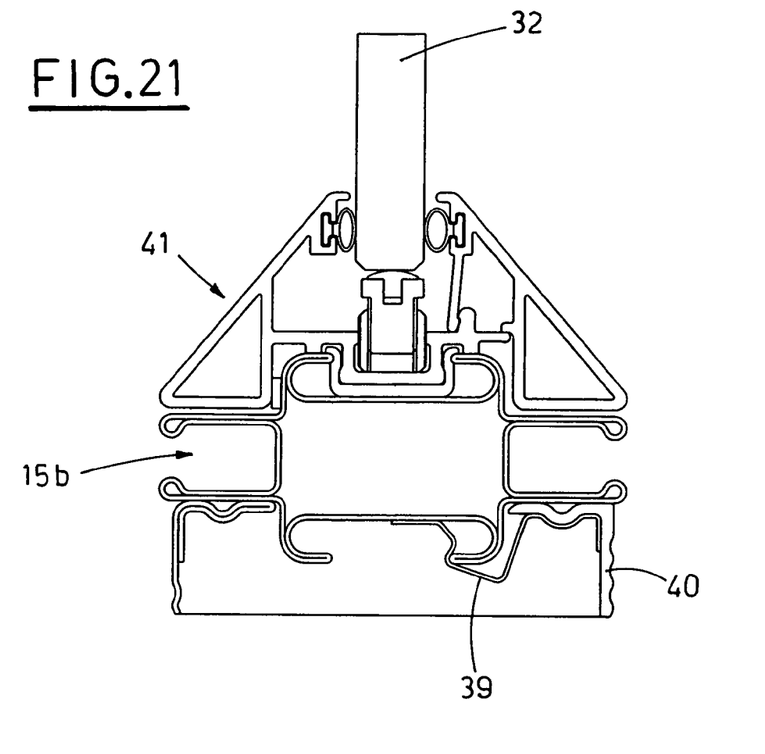
FIGS. 21 and 22 schematically illustrate the coupling between a crosspiece, whose cross section differs in shape from that of FIG. 20, and a component for supporting one and two panels, respectively.
Figure 22:
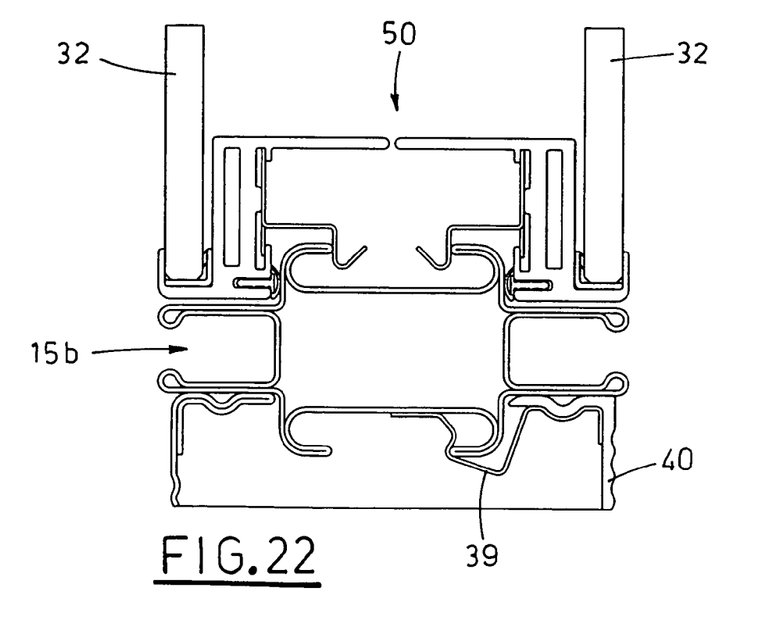
Figure 23:
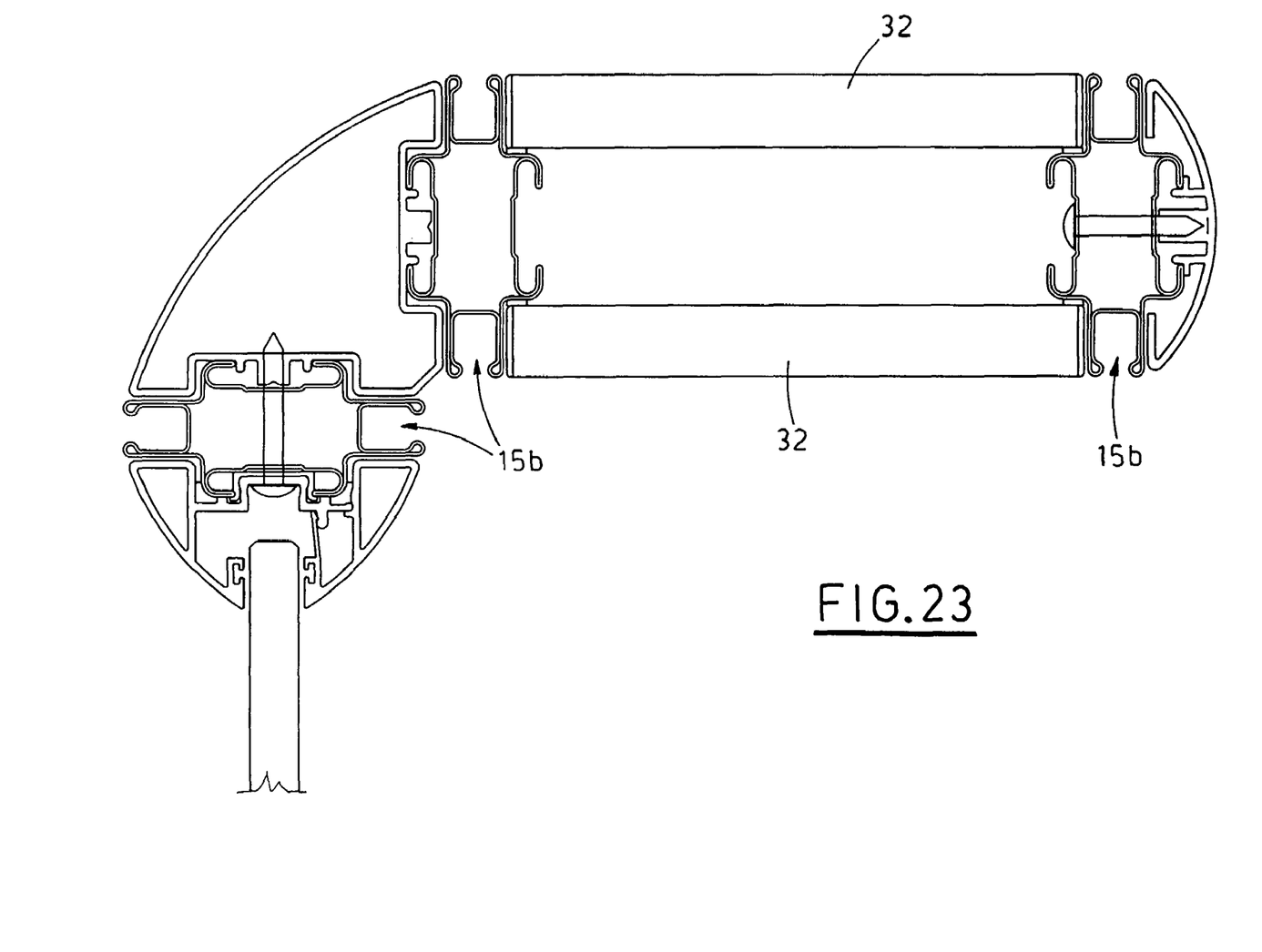
FIG. 23 schematically illustrates a constructional detail of a corner portion of a segmented partition wall according to the invention.

FIGS. 21 and 22 respectively illustrate elements 41 and 50 coupled in known manner with a matching longitudinal groove 15mb in the crosspiece 15b and designed to support panels 32, consisting, for example, of glass panes, double glazing or single or double panelling. FIG. 23, on the other hand, illustrates an embodiment of a corner portion of a segmented partition wall.

In this second embodiment, the first operating units 3b, 3d engage the lower profile section 1 to form a bayonet joint in the manner described above with reference to the other embodiment.

FIG. 9 shows how the connector 8b is pressed into the longitudinal through hole in the upright 6b until the shoulder 45 abuts against the respective end of the upright.

The means 9b, consisting of the threaded shank 10b, enable the connector 8b to be joined to the rest of the first operating unit 3b, permitting adjustment of the distance between the two parts; as a result, a rigid assembly consisting of the lower profile section 1, the first operating unit 3b and the upright 6b is created.

As to the coupling between the crosspiece 15b and the first operating unit 3d, it may be noticed that the plate 18 forms a bayonet joint with the crosspiece 15b: the plate 18 is inserted freely into the longitudinal groove 15mb that faces the lower profile section 1, and is then turned through a certain angle (for example ninety degrees) about its vertical axis in such a way as to slot the protrusions 22 into the lateral recesses 15h, 15j of the longitudinal groove 15mb. This causes elastic deformation of the respective parts of the recesses in contact with the protrusions 22, thus creating a secure coupling between the first operating unit 3d and the crosspiece 15b.

The connection of an upright 6b to a crosspiece 15b or to an intermediate crosspiece 31 is accomplished in the same way as described above. In coupling the upright 6b and the crosspiece 15b, exact alignment between the two parts is made possible by the fact that the locking means 37, in the fastened condition, abut against the shoulder 45 of the connector 8b, thus creating a predetermined reference of the lower part of the crosspiece 15b relative to the bottom end of the upright 6b, so as simplify assembly operations.

The second embodiment just described offers the same advantages as those of the first embodiment described earlier, thus fully achieving the above mentioned aims of the invention.

Lastly, it should be noticed that the upright 6 might be fastened to vertical profile sections (not shown in FIG. 1) having the same functions and features as the lower and upper profile sections 1 and 2. These might be provided, for example, if the structure has to be fastened to a fixed frame positioned at the side of the structure.

It will be understood that the invention as described above by way of example with reference to non-restricting embodiments of it may be modified and adapted in several ways for the purposes of its practical application without thereby departing from the scope of the inventive concept as claimed below.

What is claimed is:

1. A structure for supporting components to form a wall, including: at least one lower profile section, fastened to a fixed support, and having longitudinal recesses on each side thereof;
 a first operating unit associated with a base of the lower profile section, the first operating unit being removably coupled at top to at least one structural element, the structural element being an upright with at least one longitudinal through hole made in it and being equipped, at an end facing the lower profile section, with at least one foot, shaped to form at least one protrusion for coupling, when the first operating unit is rotated about a vertical axis, with the longitudinal recesses by engagement to at least the protrusion with a matching portion of the longitudinal recesses to form a bayonet joint between the first operating unit and the lower profile section, the first operating unit including:
 a base member having the foot made on it;
 a connector pressed into the hole in the upright; and means for joining the base member and the connector to each other to form a rigid assembly consisting of the lower profile section, the first operating unit and the upright, and,
 a further structural element consisting of a crosspiece,
 a clamp for joining said two structural elements to each other and comprising: two jaws hinged to each other at first ends by hinge means designed to fasten the jaws themselves to an inside portion of an end of the crosspiece;
 locking means, provided at ends of said jaws protruding from the crosspiece for coupling with retaining means made on the upright, with said jaws abutting against pins having equal height, arranged on the connector around the hole;
 spreading means being provided to interact with the jaws in such a way as to cause the locking means to move apart, thereby pressing said locking means against said retaining means so as to lock the crosspiece to the upright.

2. The structure as claimed in claim 1, wherein the coupling by engagement of the protrusion with at least one matching portion of the longitudinal recesses, causes elastic deformation of the material from which said portion is made.

3. The structure as claimed in claim 1, further comprising an upper profile section fastened to a fixed frame and shaped to form longitudinal recesses on each side of it and
 a second operating unit associated with the upper profile section removably coupled at the bottom to at least one second structural element and being equipped, at the end facing the upper profile section, with at least one second foot shaped to form at least one second protrusion which, when the second operating unit is rotated about a vertical axis, enables the second foot to be coupled with the second longitudinal recesses by engagement of the second protrusion with a matching portion of the recesses to form a bayonet joint between the second operating unit and the upper profile section.

4. The structure as claimed in claim 3, wherein the second structural element is an upright with at least one longitudinal through hole made in it, and the second operating unit comprises:
 a second base member having the second foot made on it;
 a second connector pressed into the hole in the upright; and
 second means for joining the second connector to the second base member to form a rigid assembly consisting of the upper profile section, the second operating unit and the upright.

5. The structure as claimed in claim 4, wherein the second means for joining the second connector to the second base member permit adjustment of the distance between the two parts.

6. The structure according to claim 4, wherein the second joining means consist of a second threaded shank, fastened to the second base member and extending vertically from the latter into a second threaded axial hole made in the second connector so as to enable the distance between the second connector and the second base member to be adjusted, second means being provided to keep the coupling between the second shank and the second threaded hole tight.

7. The structure according to claim 4, wherein the second joining means consist of a second threaded shank, fastened on one side by second fastening means to the second connector and engaged on the other side with at least one second threaded hole made in the second base member so as to enable the distance between the second connector and the second base member to be adjusted, second means being provided to keep the coupling between the second shank and the second threaded hole tight.

8. The structure according to claim 3, wherein the crosspiece has at least one longitudinal groove accessible from the outside, and the second operating unit comprises:
 a second base member, having the second foot;
 a second plate designed to be slotted into the longitudinal groove in the crosspiece; and
 second joining means for joining the second plate to the second base member to form a rigid assembly consisting of the upper profile section, the second operating unit and the crosspiece.

9. The structure according to claim 8, wherein the second means for joining the second plate to the second base member permit adjustment of the distance between the two parts.

10. The structure according to claim 8, wherein the second joining means consist of a second threaded shank, fastened on one side to the second base member and engaged on the other side with a second threaded hole made in the second plate so as to enable the distance between the second plate and the second base member to be adjusted, second means being provided to keep the coupling between the second threaded shank and the second threaded hole in the second plate tight.

11. The structure according to claim 8, wherein the cross section of the longitudinal groove has a dovetail shape.

12. The structure according to claim 8, wherein the threaded hole made in the plate is a through hole and the structure further comprises
 a transversal hole made in the wall that delimits the longitudinal groove in the crosspiece, coaxial with the aforementioned second threaded through hole to enable the second threaded shank to pass freely through the second plate and the second transversal hole so as to adjust the distance between the second plate and the second base member.

13. The structure according to claim 12, wherein the cross section of the longitudinal groove has a dovetail shape.

14. The structure according to claim 3, wherein the crosspiece has at least one longitudinal groove accessible from the outside, wherein the second operating unit comprises:
 a second base member, having the second foot;
 a second plate designed to be slotted in bayonet joint fashion into the longitudinal groove in the crosspiece; and
 second joining means for joining the second plate to the second base member to form a rigid assembly consisting of the upper profile section, the second operating unit and the crosspiece.

15. The structure according to claim 14, wherein the longitudinal groove in the crosspiece is shaped to form respective lateral recesses and the second plate is shaped to form at least one second protrusion, which, when the second plate is rotated about a vertical axis, enables the lateral ends of the second plate to be coupled with the lateral recesses by engagement of the second protrusion with at least one matching portion of the lateral recesses to form the aforementioned bayonet joint between the second plate and the crosspiece.

16. The structure according to claim 14, wherein the second joining means for joining the second plate to the second base member permit adjustment of the distance between the two parts.

17. The structure according to claim 16, wherein the longitudinal groove in the crosspiece is shaped to form respective lateral recesses and the second plate is shaped to form at least one second protrusion, which, when the second plate is rotated about a vertical axis, enables the lateral ends of the second plate to be coupled with the lateral recesses by engagement of the second protrusion with at least one matching portion of the lateral recesses to form the aforementioned bayonet joint between the second plate and the crosspiece.

18. The structure according to claim 14, wherein the second joining means consist of a second threaded shank, fastened on one side by second fastening means to the second plate and engaged on the other side with at least one second threaded hole made in the second base member so as to enable the distance between the second plate and the second base member to be adjusted, second means being provided to keep the coupling between the second shank and the second threaded hole tight.

19. The structure according to claim 18, wherein the longitudinal groove in the crosspiece is shaped to form respective lateral recesses and the second plate is shaped to form at least one second protrusion, which, when the second plate is rotated about a vertical axis, enables the lateral ends of the second plate to be coupled with the lateral recesses by engagement of the second protrusion with at least one matching portion of the lateral recesses to form the aforementioned bayonet joint between the second plate and the crosspiece.

20. The structure as claimed in claim 1, wherein the means for joining the connector to the base member permit adjustment of the distance between the two parts.

21. The structure according to claim 1, wherein the joining means consist of a threaded shank, fastened to the base member and extending vertically from the latter into a threaded axial hole made in the connector so as to enable the distance between the connector and the base member to be adjusted, means being provided to keep the coupling between the shank and the threaded hole tight.

22. The structure as claimed in claim 1, wherein the joining means consist of a threaded shank, fastened on one side by fastening means to the connector and engaged on the other side with at least one threaded hole made in the base member so as to enable the distance between the connector and the base member to be adjusted, means being provided to keep the coupling between the shank and the threaded hole tight.

23. The structure according to claim 1, wherein the crosspiece has at least one longitudinal groove, accessible from the outside, and the first operating unit includes:
a plate designed to be slotted into the longitudinal groove in the crosspiece; and
joining means for joining the plate to the base member to form a rigid assembly consisting of the lower profile section, the first operating unit and the crosspiece.

24. The structure according to claim 23, wherein the joining means for joining the plate to the base member permit adjustment of the distance between the two parts.

25. The structure according to claim 23, wherein the joining means consist of a threaded shank, fastened on one side to the base member and engaged on the other side with at least one threaded hole made in the plate so as to enable the distance between the plate and the base member to be adjusted, means being provided to keep the coupling between the threaded shank and the threaded hole in the plate tight.

26. The structure according to claim 25, wherein the threaded hole made in the plate is a through hole and the structure further comprises:
a transversal hole made in the wall that delimits the longitudinal groove in the crosspiece, coaxial with the aforementioned threaded through hole, to enable the threaded shank to pass freely through the plate and the transversal hole so as to adjust the distance between the plate and the base member.

27. The structure according to claim 26, wherein the cross section of the longitudinal groove has a dovetail shape.

28. The structure according to claim 23, wherein the cross section of the longitudinal groove has a dovetail shape.

29. The structure according to claim 1, wherein the crosspiece has at least one longitudinal groove accessible from the outside, and the first operating unit includes:
a plate designed to be slotted in bayonet joint fashion into the longitudinal groove in the crosspiece; and
joining means for joining the plate to the base member to form a rigid assembly consisting of the lower profile section, the first operating unit and the crosspiece.

30. The structure according to claim 29, characterised in that the means for joining the plate to the base member permit adjustment of the distance between the two parts.

31. The structure according to claim 30, wherein the longitudinal groove in the crosspiece is shaped to form respective lateral recesses and the plate is shaped to form at least one protrusion, which, when the plate is rotated about a vertical axis, enables the lateral ends of the plate to be coupled with the lateral recesses by engagement of the protrusion with at least one matching portion of the lateral recesses to form the aforementioned bayonet joint between the plate and the crosspiece.

32. The structure according to claim 29, wherein in that the joining means consist of a threaded shank, fastened on one side by fastening means to the plate and engaged on the other side with at least one threaded hole made in the base member so as to enable the distance between the plate and the base member to be adjusted, means being provided to keep the coupling between the shank and the threaded hole tight.

33. The structure according to claim 32, wherein the longitudinal groove in the crosspiece is shaped to form respective lateral recesses and the plate is shaped to form at least one protrusion, which, when the plate is rotated about a vertical axis, enables the lateral ends of the plate to be coupled with the lateral recesses by engagement of the protrusion with at least one matching portion of the lateral recesses to form the aforementioned bayonet joint between the plate and the crosspiece.

34. The structure according to claim 29, wherein the longitudinal groove in the crosspiece is shaped to form respective lateral recesses and the plate is shaped to form at least one protrusion, which, when the plate is rotated about a vertical axis, enables the lateral ends of the plate to be coupled with the lateral recesses by engagement of the protrusion with at least one matching portion of the lateral recesses to form the aforementioned bayonet joint between the plate and the crosspiece.

35. The structure according to claim 1, wherein the hinge means consist of a pin inserted into a first and a second socket made, respectively, in the upper and lower walls of the crosspiece to prevent the clamp from sliding off the crosspiece itself.

36. The structure according to claim 1, wherein the retaining means are shaped to match the locking means.

37. The structure according to claim 1, wherein the upright has at least one longitudinal groove accessible from the outside, and the retaining means are formed by opposite walls of the longitudinal grooves.

38. The structure according to claim 1, wherein the first operating unit is provided, at an end facing the lower profile section and on two opposite sides, with two feet, each shaped to form at least one protrusion which, when the first operating unit is rotated about a vertical axis, enables the feet to be coupled with the longitudinal recesses engagement at least of the protrusions with matching portions of the recesses to form a bayonet joint between the first operating unit and the lower profile section.

39. A structure for supporting components to form a wall, including:
  at least one lower profile section, fastened to a fixed support, and having longitudinal recesses on each side thereof;
  a first operating unit associated with a base of the lower profile section, the first operating unit being removably coupled at top to at least one structural element, the structural element being an upright with at least one longitudinal through hole made in it and being equipped, at an end facing the lower profile section, with at least one foot, shaped to form at least one protrusion for coupling, when the first operating unit is rotated about a vertical axis, with the longitudinal recesses by engagement to at least the protrusion with a matching portion of the longitudinal recesses to form a bayonet joint between the first operating unit and the lower profile section, the first operating unit including:
  a base member having the foot made on it;
  a connector pressed into the hole in the upright; and means for joining the base member and the connector to each other to form a rigid assembly consisting of the lower profile section, the first operating unit and the upright, and
  a further structural element consisting of a crosspiece;
  a clamp for joining said two structural elements to each other and comprising: two jaws hinged to each other at first ends by hinge means designed to fasten the jaws themselves to an inside portion of an end of the crosspiece;
  locking means, provided at ends of said jaws protruding from the crosspiece for coupling with retaining means made on the upright, with said jaws abutting against a shoulder, made on the connector around the hole;
  spreading means being provided to interact with the jaws in such a way as to cause the locking means to move apart, thereby pressing said locking means against said retaining means so as to lock the crosspiece to the upright.

40. The structure according to claim 39, wherein the hinge means consist of a pin inserted into a first and a second socket made, respectively, in the upper and lower walls of the crosspiece to prevent the clamp from sliding off the crosspiece itself.

41. The structure according to claim 39, wherein the retaining means are shaped to match the locking means.

42. The structure according to claim 39, wherein the upright has at least one longitudinal groove accessible from the outside, and the retaining means are formed by opposite walls of the longitudinal grooves.

43. A structure for supporting components to form a wall, including:
  at least one lower profile section, fastened to a fixed support and having longitudinal recesses on each side thereof;
  a first operating unit associated with a base of the lower profile section, the first operating unit being removably coupled at top to at least one structural element, the structural element being an upright with at least one longitudinal through hole made in it and being equipped, at an end facing the lower profile section, with at least one foot, shaped to form at least one protrusion for coupling, when the first operating unit is rotated about a vertical axis, with the longitudinal recesses by engagement to at least the protrusion with a matching portion of the longitudinal recesses to form a bayonet joint between the first operating unit and the lower profile section, the first operating unit including:
  a base member having the foot made on it;
  a connector pressed into the hole in the upright; and means for joining the base member and the connector to each other to form a rigid assembly consisting of the lower profile section, the first operating unit and the upright,
  the connector being a rectangular plate that mounts a plurality of pins shaped to form at a top thereof a radial structural element, the connector inserted into the hole of the upright by press fitting the radial structural element into the hole until the plate abuts a matching end of the upright, the connection having a through hole with two different diameter openings, a diameter at a bottom end thereof being of a small diameter to form an annular crown.

44. A structure for supporting components to form a wall, including:
  at least one lower profile section, fastened to a fixed support and having longitudinal recesses on each side thereof;
  a first operating unit associated with a base of the lower profile section, the first operating unit being removably coupled at top to at least one structural element, the structural element being an upright with at least one longitudinal through hole made in it and being equipped, at an end facing the lower profile section, with at least one foot, shaped to form at least one protrusion for coupling, when the first operating unit is rotated about a vertical axis, with the longitudinal recesses by engagement to at least the protrusion with a matching portion of the longitudinal recesses to form a bayonet joint between the first operating unit and the lower profile section, the first operating unit including:
  a base member having the foot made on it;
  a connector pressed into the hole in the upright; and means for joining the base member and the connector to each other to form a rigid assembly consisting of the lower profile section, the first operating unit and the upright,
  the connector shaped to form a shoulder and having a through hole with two different diameter openings, a diameter at a bottom end thereof being of a smaller diameter to form an annular crown, the connector being pressed into a longitudinal through hole in the upright until the shoulder abuts against a respective end of the upright.

* * * * *